United States Patent [19]

Carpenter et al.

[11] Patent Number: 5,725,780
[45] Date of Patent: Mar. 10, 1998

[54] METHOD FOR USING NOVEL HIGH SOLIDS POLYMER COMPOSITIONS AS FLOCCULATION AIDS

[75] Inventors: Michael M. Carpenter, Moon Township; Ronald J. Falcione, Canonsburg, both of Pa.

[73] Assignee: Calgon Corporation, Pittsburgh, Pa.

[21] Appl. No.: 758,107

[22] Filed: Nov. 25, 1996

Related U.S. Application Data

[63] Continuation of Ser. No. 391,870, Feb. 22, 1995, abandoned.
[51] Int. Cl.$^6$ .................................................... C02F 1/56
[52] U.S. Cl. ........................... 210/728; 210/733; 210/734; 210/735; 162/168.1; 162/168.3; 524/922
[58] Field of Search ............................... 162/164.1, 164.6, 162/168.3, 168.1; 210/725, 727, 728, 732, 733, 734, 735, 736; 523/331, 339, 340, 342, 343; 524/922, 924

[56] References Cited

U.S. PATENT DOCUMENTS

| | | | |
|---|---|---|---|
| 3,985,651 | 10/1976 | Newman | 210/734 |
| 4,046,683 | 9/1977 | Tsunoda et al. | 210/20 |
| 4,299,755 | 11/1981 | Keggenhoff et al. | 260/23 AR |
| 4,585,812 | 4/1986 | Field | 523/221 |
| 5,480,921 | 1/1996 | Hunter et al. | 523/331 |

*Primary Examiner*—Peter A. Hruskoci
*Attorney, Agent, or Firm*—Diane R. Meyers

[57] ABSTRACT

A method for flocculating suspended solids from an aqueous system containing water and said suspended solids comprising adding to said aqueous system an effective amount of a flocculating agent, wherein said flocculating agent is a pourable non-aqueous, polymer composition containing less than about 5%, water and greater than 60%, polymer solids. The polymer of the instant polymer compositions may be anionic, non-ionic, cationic or amphoteric. Related compositions are also claimed.

8 Claims, No Drawings

METHOD FOR USING NOVEL HIGH SOLIDS POLYMER COMPOSITIONS AS FLOCCULATION AIDS

This is a continuation of application Ser. No. 08/391,870 filed Feb. 22, 1995, now abandoned.

BACKGROUND OF THE INVENTION

Flocculation is a form of liquid-solid phase separation which facilitates the removal of finely divided particles suspended in a liquid, usually water, by enhancing agglomeration of such suspended particles in order to increase particle size. Thus, flocculation generally involves the process of agglomerating particles into settleable flocs, thereby resulting in a clarified liquid phase. Flocculation, which is often utilized to enable conformity with effluent clarity requirements, may be accomplished by chemical means, through the addition of a flocculating agent or flocculant.

Inorganic and synthetic polymeric flocculating agents have been utilized commercially for many years. High molecular weight water soluble polymers are particularly useful as chemical flocculating agents. Such polymeric flocculating agents can be prepared in several forms. These polymers, which may be anionic, nonionic, cationic or amphoteric, react with fine particles or colloids so as to bridge them into insoluble precipitates or flocs.

Though water-soluble polymers have been used successfully as flocculating agents in the water treatment field, it has become increasingly desirable to improve the performance of conventional, polymeric flocculants by providing a flocculating agent which meets treatment objectives while minimizing dosage and cost.

Conventionally, flocculating polymers are available in solution and dry forms; it is also known in the art that water-soluble flocculating polymers can be dispersed or suspended into the oil phase of water-in-oil polymer compositions. Thus, conventional emulsion polymerization techniques generally involve either:

(1) forming a water-in-oil emulsion of an aqueous solution of at least one water-soluble ethylenically unsaturated monomer in an inert hydrophobic liquid medium and polymerizing said monomer or monomers in said medium to form a polymer emulsion; or (2) forming a water soluble polymer and then suspending or emulsifying the polymer solids into a composition having a hydrophobic liquid as the continuous phase.

In any of the above mentioned delivery forms, virtually any water soluble monomer containing a $CH_2=C$ functional group can be polymerized. Thus, anionic, cationic, nonionic and amphoteric flocculating polymers can be prepared by conventional solution or emulsion polymerization techniques to form solution polymers, dry polymers, or polymer suspensions or emulsions.

The instant invention relates to an improved flocculation method which utilizes a novel delivery form for high molecular weight, anionic, cationic, nonionic or amphoteric flocculant polymers. Thus, the use of conventional flocculant polymers in a new delivery system is disclosed, thereby providing an improved method of flocculation. This new method provides the combined advantages of liquid, solid and emulsion polymer forms without any of the major drawbacks generally associated therewith. Additionally, in some instances, the instant invention provides significant performance advantages, such as reduced dosage requirements and/or enhanced dewatering. Thus, in addition to advantages relating to the product form, the inventors have shown that the instant flocculant polymer compositions may also provide substantially improved performance over the same active polymers (at identical dosages, on an active polymer basis) delivered in conventional product forms.

Although high molecular weight, water soluble polymers in solution, dry or emulsion form have been proven effective as flocculants, each of these product forms has disadvantages which generally preclude optimal performance of the underlying polymer chemistry. For example, liquid products offer low active polymer solids (e.g., 5–10% weight) and are generally not cost effective. Dry polymer products, which offer high active polymer solids (e.g., 85–95% weight), are difficult to feed, highly sensitive to water contamination and may create dust problems. Products in the form of emulsions (water-in-oil), which generally contain about 25–50%, by weight, active solids, are easy to feed, but offer a number of storage stability disadvantages which degrade the performance of these products. The problems with storage stability include oil separation or settling of the active polymer solids, which leads to the application of inconsistent product concentrations, and temperature cycling, which causes sheets and skins of hydrated polymer to occur in storage vessels, adversely affecting the products performance characteristics. Also, the high level of oil in the continuous phase of emulsions is believed to have a negative impact of the flocculating performance of the polymer dispersed therein.

Further, aside from the novel flocculant polymer delivery form described herein, water soluble polymers containing in excess of about 60% solids are currently only commercially available in dry or gel form. Dry polymers are generally prepared by drying conventional solution polymers, and gels are simply high viscosity polymer solutions which can not be transported as liquids. They are generally adherent, tough, rubbery substances which retain their shape when placed on flat surfaces. Gels are not generally used in gel form but instead as dilute solutions of the polymer. Dilution methods oftentimes involve mechanical steps which result in the degradation of certain properties of the polymers, such as molecular weight.

Also, it is known that to obtain polymers having high molecular weights and good water solubility properties, it is necessary to retard or reduce crosslinking reactions during polymerization to the extent possible. In this respect, it is desirable to prepare polymers under relatively mild conditions, e.g., conducting polymerization reactions using relatively low monomer concentrations.

Unfortunately, aqueous solution polymerization techniques which use low monomer concentrations require the resulting solution polymers be dried to prepare powdered polymers, thus resulting in increased manufacturing costs and degradation of polymer properties such as molecular weight and solubility.

Though there is a long felt need in industry for stable, high molecular weight, water soluble, easily handled flocculant polymer delivery systems containing in excess of 60%, preferably in excess of 70%, active polymer, this need has not been met because of the art's inability to efficiently concentrate liquid polymer compositions to a stable, pourable form having a high polymer content without substantially degrading the resulting polymers.

A major benefit of the instant flocculation method is that it utilizes flocculant polymer compositions that generally yield the economic advantages of dry polymers compared to emulsion and solution polymers, with the additional advantages associated with emulsion polymers. Thus, water soluble flocculant polymers of high molecular weight are applied in a pourable, stable liquid form. Further, this invention advances the art of flocculation in that stable, pourable, high molecular weight, water soluble flocculant polymer compositions containing in excess of about 60%, preferably in excess of 70%, active polymer are utilized. As an added benefit, these compositions, particularly those which are cationic or anionic, offer superior performance over conventional flocculant polymer forms.

SUMMARY OF THE INVENTION

The instant invention relates, in general terms, to the use of non-aqueous, high solids polymer/emulsifying surfactant/ hydrophobic liquid compositions as flocculants. These compositions are prepared by treating a conventional starting polymer emulsion so as to substantially eliminate water therefrom, followed by one or more separation steps such as centrifugation, filtration or evaporation steps to form concentrated, non-aqueous polymer compositions. The resulting flocculant polymer compositions contain less than 5%, preferably less than 3%, more preferably less than 2%, water, and greater than 60%, preferably greater than 70% polymer solids, based on total composition weight, and are in a pourable, stable form.

These novel flocculant compositions are added via conventional means to an aqueous suspension of fine solids for the purpose of flocculating said solids. Effective amounts of the instant flocculant compositions are used, and they are introduced at conventional points of addition. The use of the instant polymer compositions as flocculants or flocculating aids is not known or suggested in the art.

DETAILED DESCRIPTION OF THE INVENTION

In its broadest sense, the instant invention relates to a method for flocculating suspended solids from an aqueous system containing said suspended solids and water comprising adding to said aqueous system an effective amount of a flocculating agent, wherein said flocculating agent is a pourable, non-aqueous, water soluble polymer composition containing less than about 5%, preferably less than about 3%, based on the weight of said non-aqueous, polymer composition, water and greater than 60%, preferably greater than about 70%, based on the weight of said non-aqueous, water soluble polymer composition, polymer solids. Such polymer compositions can be prepared from a starting water-in-oil emulsion polymer composition via the use of evaporation, preferably falling film evaporation, and one or more additional separation steps, preferably centrifuge steps, to dehydrate and concentrate a starting water-in-oil polymer emulsion or suspension, as described in copending U.S. patent application Ser. Nos. 08/299,689; 08/315,371; and 08/273,688. The flocculant compositions of this invention are commercially available from Calgon Corporation under the ECLIPSE™ trademark.

The flocculating polymer compositions of the instant method are stable, pourable compositions which are essentially non-aqueous and which contain in excess of about 60% polymer solids and less than about 5% water, preferably in excess of 70% polymer and less than about 3% water. More preferably, these compositions contain less than about 2% water.

The instant invention is also directed to a composition comprising: a) an aqueous system comprising water and suspended solids; and b) an effective amount of a flocculating agent comprising a pourable, non-aqueous, water soluble polymer composition containing less than about 5%, preferably less than about 3%, water and greater than about 60%, preferably greater than about 70%, polymer solids, based on the total weight of the polymer composition. More preferably, these polymer compositions contain less than about 2% water and greater than about 70% polymer, based on total weight of the polymer composition.

The non-aqueous, pourable, water soluble polymer composition of the instant method can be prepared by concentrating a starting water-in-oil polymer composition comprising: 1) about 25 to about 95%, based on total composition weight, of an aqueous phase comprising about 10 to about 60%, based on the weight of 1), of a water soluble polymer, and the balance substantially water; 2) about 0.5 to about 20%, based on total composition weight, of at least one emulsifying surfactant; and 3) about 25 to about 95%, based on total composition weight, of a hydrophobic liquid, which method of concentrating comprises: a) dehydrating said starting water-in-oil polymer composition using an evaporator, preferably a falling-film evaporator, to produce a polymer/emulsifying surfactant/hydrophobic liquid composition which is substantially water free, i.e., which contains less than about 5%, preferably less than 3%, more preferably from about 0.1 to about 2.5% water, and most preferably from about 0.1 to about 2.0%, water; b) centrifuging said polymer/emulsifying surfactant/hydrophobic liquid composition so as to remove some portion of said hydrophobic liquid therefrom, thereby producing a concentrated polymer/emulsifying surfactant/hydrophobic liquid composition and a centrifuge raffinate, wherein said concentrated polymer/emulsifying surfactant/hydrophobic liquid composition contains less than about 5%, preferably less than about 3%, more preferably less than about 2%, water, greater than about 60%, more preferably greater than about 70%, polymer and about 0.1 to about 10% emulsifying surfactant; c) optionally treating said centrifuge raffinate in a second separation device, such as a centrifuge, filter or evaporator, preferably a centrifuge, thereby producing a second concentrated polymer composition and a second raffinate stream; d) optionally blending said second concentrated polymer composition from said second separation device with said concentrated polymer/emulsifying surfactant/hydrophobic liquid composition and recycling or disposing of said second raffinate stream; and e) optionally adding an effective amount of a steric stabilizer, preferably a $C_4$–$C_{20}$ alkyl (meth)acrylate homo or copolymer, to the resulting concentrated composition.

In this method for concentrating a starting emulsion, the evaporator is preferably a falling-film evaporator, more preferably a thin film evaporator, the centrifuge of b) is preferably a decanter centrifuge and the centrifuge of c) is preferably a partially ejecting disk centrifuge. Also, if the polymer concentration of the starting water-in-oil polymer composition exceeds about 25%, based on total weight of the starting water-in-oil polymer composition, the starting composition is preferably diluted with a suitable hydrophobic liquid, preferably the oil or other hydrophobic liquid used in the starting water-in-oil polymer composition, so as to reduce the polymer concentration to less than about 25%, preferably to between about 1 to about 15% by weight, based on total composition weight.

As used relative to the instant flocculating method, the term "effective amount" refers to that amount of flocculating agent, i.e., that amount of non-aqueous, water soluble polymer composition, necessary to produce the desired flocculation effect in the system being treated. More particularly, the flocculating agent should be added to the aqueous suspension or system being treated so as to provide a polymer dosage, on an active basis, of at least about 0.1 ppm, preferably about 0.1 ppm to about 1000 ppm, more preferably from about 0.5 to about 500 ppm, based on the weight of water in the aqueous suspension being treated. Alternatively, treatment dosage can be expressed in terms of the weight of suspended solids present in the system being treated. For example, the instant compositions can be added so as to provide at least about X lbs. polymer (active basis) per ton of suspended solids in the system being treated, wherein X represents the effective amount of flocculating agent necessary to achieve treatment objectives. Such dosage determinations are well within the abilities of the skilled flocculation practitioner.

The instant flocculating agent can be added via any suitable means. Thus, these polymer compositions can generally be dosed into the suspension to be treated via conventional metering/feed equipment. Conventional points of addition should be used. Multiple points of addition may be beneficial.

The instant invention is also directed to an improved method for clarifying an aqueous system containing suspended solids via addition of an effective amount of a water soluble polymer flocculating agent, wherein the improvement comprises using as the flocculating agent an effective amount of the instant non-aqueous, water soluble polymer compositions.

The inventors believe that virtually any type of starting water-in-oil polymer composition can be concentrated to form the instant flocculants. Thus, as used herein, the term "water-in-oil polymer composition" includes virtually any water-in-oil emulsion, dispersion or suspension containing a water soluble polymer prepared from an ethylenically unsaturated monomer or monomers, wherein said polymer is a portion of an aqueous phase which is dispersed, emulsified or suspended by one or more surfactants in a system having a hydrophobic liquid as the continuous phase, and wherein the polymer comprises less than about 60%, by weight, of the composition.

The Applicants also believe that any conventional water soluble flocculant polymer that can be prepared in water-in-oil emulsion or suspension form can be utilized in the instant flocculant method. Thus, anionic, cationic, nonionic and amphoteric flocculating polymers can be used.

More particularly, the instant invention can utilize non-aqueous anionic or nonionic flocculant polymer compositions prepared from starting emulsions of water soluble polymers prepared from ethylenically unsaturated monomers including, inter alia, N-vinyl pyrrolidone, N-vinyl formamide, ethoxylated acrylate and methacrylate esters such as hydroxyethyl methacrylate (HEM) and the 5, 10 and 20 mole ethoxylates of HEM, acrylamide, methacrylamide, N,N-dimethylacrylamide, N-i-propylacrylamide, N-tert-butylacrylamide, acrylic acid, α-halo acrylic acid, maleic acid or anhydride, itaconic acid, vinyl acetic acid, allyl acetic acid, methacrylic acid, acrylonitrile, vinyl sulfonic acid, allyl sulfonic acid, vinyl phosphonic acid, vinyl acetate, 2-acrylamido-2-methylpropane sulfonic acid (AMPSA), 2-methacrylamido-2-methylpropane sulfonic acid (methAMPSA), styrene sulfonic acid, hydroxyalkyl acrylates, β-carboxyethylacrylic acid, β-sulfoalkyl (meth) acrylates, sulfoalkyl methacrylates, allyloxy-2-hydroxypropane sulfonic acid, and methacrylamido hydroxypropyl sulfonic acid, alone or in combination. Generally, salts of such polymers can also be used.

The starting emulsion may also include flocculating polymers which are cationic, such as polymers prepared from dimethyldiallyl ammonium chloride (DMDAAC), diethyldiallyl ammonium chloride (DEDAAC), dimethyldiallyl ammonium bromide (DMDAAB), diethyldiallyl ammonium bromide (DEDAAB), methyacryloyloxyethyltrimethyl ammonium chloride (METAC), acryloyloxyethyltrimethyl ammonium chloride (AETAC), methacryloyloxyethyltrimethyl ammonium methosulfate (METAMS), acryloyloxyethyltrimethyl ammonium methosulfate (AETAMS), methacrylamidopropyltrimethyl ammonium chloride (MAPTAC), dimethylaminoethylacrylate, dimethyl aminoethyl methacrylate and dimethylamino propylmethacrylamide, alone or in combination, and polymers made by polymerizing the above listed cationic monomers with nonionic monomers such as any of the above listed nonionic monomers, particularly acrylamide, methacrylamide or N,N-dimethylacrylamide.

Any amphoteric flocculating polymer can be used in the instant flocculating polymer compositions, including, but not limited to, polymers made by polymerizing one or more of the above listed anionic monomers with one or more of the above listed cationic monomers, wherein such polymers contain up to 20%, on a charge basis, of oppositely charged mer units. Polymers prepared from acrylic acid, methacrylic acid and/or AMPSA or methAMPSA, alone or in combination, and DMDAAC, AETAC, METAC, METAMS, and/or MAPTAC, alone or in combination, are prepared. Optionally, nonionic monomers may be included. Also, betaine polymers can be made from N(3-sulfopropyl)-N-methacryloyloxyethyl-N,N-dimethyl ammonium betaine, alone or in combination with various nonionic monomers.

Generally, the anionic, nonionic, cationic or amphoteric polymers present in the instant water-in-oil polymer compositions have weight average molecular weights greater than about 100,000, as determined by low angle light scattering techniques. Preferably, molecular weights range from about 500,000 to about 50,000,000.

Preparation of the instant flocculants requires the concentration of a starting polymer emulsion or suspension to greater than about 60% polymer solids, preferably to greater than about 70% polymer solids. The resulting flocculant polymer compositions are in a stable, pourable form, and the instant concentration process generally does not substantially alter the properties of the polymers in the starting emulsion, particularly the molecular weight or solubility characteristics of these polymers.

To prepare the instant flocculant compositions, a "starting composition" which may be a polymer emulsion, dispersion or suspension, comprising an initial weight concentration of water, an initial weight concentration of a hydrophobic liquid, an initial weight concentration of at least one emulsifying surfactant, and an initial weight concentration of a water soluble polymer is dehydrated and concentrated by a process which comprises: a) diluting the starting emulsion, if the initial polymer weight concentration exceeds about 25% of said water-in-oil polymer composition, with a suitable hydrophobic liquid so as to produce a water-in-oil composition having a polymer weight concentration of from about 0.1 to about 25%, preferably from about 1 to about 15%, based on composition weight; b) dehydrating the starting composition or the diluted composition of step a) by evaporating water from the starting or diluted water-in-oil polymer composition, preferably via falling-film evaporation, thereby lowering said initial weight concentration of water to less than about 5%, preferably less than about 3%, more preferably to between about 0.1 and about 2.0% and most preferably to between about 0.1 to about 1.5%, and producing an evaporator concentrate; and c) treating the evaporator concentrate of step b) to remove some portion of the hydrophobic liquid from said evaporator concentrate, for example by filtration, evaporation or centrifugation, preferably by centrifugation, thereby producing a concentrated composition which is substantially a water soluble polymer and emulsifying surfactant suspension, dispersion or emulsion in a hydrophobic liquid, and a raffinate, preferably a centrifuge raffinate. The raffinate can optionally be treated via a second separation means such as a filter, centrifuge or evaporator, preferably a centrifuge, to capture additional polymers solids and to reclaim additional hydrophobic liquid.

The water-in-oil polymer composition containing a water soluble polymer prepared from an ethylenically unsaturated water soluble monomer or monomers to be concentrated generally should not contain an inverting surfactant, since inverting surfactants may hinder effective dehydration in the evaporation step, particularly when falling-film evaporation is used. Aside from this limitation, it is believed that virtually any water-in-oil polymer composition can be concentrated. For example, commercially available water-in-oil emulsion polymer suspensions or emulsions can be used, if they do not contain inverting surfactant(s). As examples of commercially available water-in-oil polymer compositions suitable as starting emulsions, one may utilize uninverted Pol-E-Z® and HYDRAID® emulsion polymers available from Calgon Corporation.

As indicated above, such emulsions or suspensions comprise a continuous hydrophobic liquid phase, at least one emulsifying surfactant and an aqueous phase containing water and a water soluble polymer. In the event that the starting water-in-oil polymer composition has an initial polymer weight concentration of greater than about 25%, based on the total weight of said water-in-oil polymer composition, the starting emulsion or suspension is preferably diluted with a suitable hydrophobic liquid so as to reduce the initial polymer weight concentration to below about 25%, i.e. to from about 0.1% to about 25%, preferably from about 1 to about 15%, based on total composition weight. As used herein, the term "suitable hydrophobic liquid" refers to any hydrophobic liquid which is compatible with the water-in-oil polymer composition to be concentrated. The same hydrophobic liquid that is used in the starting emulsion or suspension is preferred. If the starting water-in-oil polymer composition contains less than about 25% active polymer solids, the dilution step is generally unnecessary.

Using either a starting water-in-oil polymer composition having an initial polymer weight concentration of less than about 25%, or using a water-in-oil polymer composition which has been diluted with a suitable hydrophobic liquid so as to produce a water-in-oil polymer composition of less than about 25 weight % polymer, the instant process preferably requires dehydration via the use of a falling-film evaporator so as to remove water from the initial water-in-oil polymer composition having a polymer weight concentration of less than about 25%, thereby lowering the initial weight concentration of water to less than. about 5%, preferably to less than about 3%, more preferably to between about 0.1 to about 2.5% and most preferably to between about 0.1 to about 1.5%, and producing an evaporator concentrate.

As such, these compositions are referred to as non-aqueous, polymer compositions. As used herein, the term "non-aqueous" refers to polymer compositions which contain less than 5% water. Additionally, a centrifuge raffinate is produced which may be further concentrated via a concentration means such as a filter, evaporator or another centrifuge, preferably by a second centrifuge. Again, it is believed that any type of centrifuge can be used to concentrate the raffinate from the first centrifuge. However, a disk type centrifuge, preferably a partially ejecting disk centrifuge, has been found to be preferred for this second centrifugal separation. The first centrifuge raffinate generally contains less than about 5 weight % polymer solids. This stream can be concentrated via the disk centrifuge to a polymer/hydrophobic liquid composition containing in excess of about 25% polymer solids. The primary effluent from the second centrifuge can be then blended with the primary effluent from the first centrifuge to produce a final dehydrated, concentrated polymer/emulsifying surfactant/ hydrophobic liquid composition having in excess of about 60 weight % polymer solids, preferably in excess of about 70% polymer solids. The oil-rich raffinate from the second centrifuge can be recycled to improve the overall efficiency of the concentration process.

After removal of some portion of the hydrophobic liquid via one or more centrifuge steps, a stabilizer is preferably added. In theory, any compound which stabilizes the concentrated polymer and emulsifying surfactant-in-oil composition by reducing its tendency to compact or separate can be used. $C_4$–$C_{20}$ alkyl (meth)acrylate homopolymers and $C_4$–$C_{20}$ alkyl (meth)acrylate/(meth)acrylic acid copolymers having weight average molecular weights between about 10,000 and about 5,000,000, as determined in low angle light scattering, have been found to be especially effective as stabilizers for the instant flocculant polymer compositions. For example, 99.5/0.5 w/w laurylmethacrylate/methacrylic acid polymers having molecular weights ranging from about 10,000 to about 5,000,000 have been found to be preferred stabilizers. An effective amount, for the purpose of stabilizing the instant flocculants against settling/compaction, of the stabilizer should be used, preferably at least about 0.1 ppm, based on the weight of the concentrated composition to be stabilized. Such stabilizers are prepared by conventional solution polymerization techniques (see, for example, U.S. Pat. No. 4,833,198).

The instant flocculating aids are believed to be useful in virtually any flocculation application, including, but not limited to: papermaking process applications, including drainage/retention and formation applications; industrial sludge or waste dewatering applications; lead removal applications; industrial sludge thickening applications; municipal waste treatment applications; benefaction of mineral ore applications; applications relating to the removal of coagulated metallic hydroxides from aqueous systems; oily waste separation applications; laundry waste applications; animal processing waste applications; and water clarification applications.

Preferred anionic flocculating compositions of this invention contain anionic polymers prepared from (meth)acrylic acid and/or 2-acrylamido-2 methylpropyl sulfonic acid, alone or in combination. Meth(acrylamide) may also be present. More preferred anionic polymers comprise from about 50/50 w/w to about 1/99 w/w (meth) acrylic acid/ (meth) acrylamide and range in weight average molecular weight from about 100,000 to about 50,000,000, as determined by low angle light scattering.

Particularly preferred anionic polymers contain about 40/60 w/w to about 5/95 w/w (meth)acylic acid/(meth) acrylamide. Such polymers are particularly useful in flocculating coagulated insoluble hydroxides of metals such as Zn, Cu, Cr, Ni and Fe from aqueous systems.

Preferred cationic flocculation compositions of this invention contain cationic polymers prepared from DMDAAC, AETAC, METAC, MAPTAC and/or METAMS, alone or in combination. Such polymers may also contain (meth) acrylamide. These polymers have weight average molecular weights ranging from about 100,000 to about 50,000,000, as determined by low angle light scattering. More preferred polymers comprise from about 90/10 to about 3/97 w/w a)/b, wherein a) is selected from the group consisting of DMDAAC, AETAC, METAC, MAPTAC and METAMS and b) is (meth) acrylamide.

Preferred nonionic flocculating composition of this invention contain (meth)acrylamide polymers having weight average molecular weights ranging from about 100,000 to about 50,000,000, as determined by low angle light scattering.

Preferred amphoteric flocculating compositions of this invention are prepared using the same preferred monomers listed above for anionic and cationic polymers but additionally containing up to about 20%, on a charge basis, of at least one oppositely charged preferred monomer.

EXAMPLES

The following examples are intended to further demonstrate the invention, but should not be interpreted as limiting the invention in any way.

Examples 1–3

Preparation of Anionic and Cationic Flocculating Polymer Compositions

Flocculating polymer compositions were prepared using the following starting polymer compositions:

|  | Starting Polymer 1 | Starting Polymer 2 | Starting Polymer 3 |
|---|---|---|---|
|  | 77/23 w/w AM/AETAC | 40/60 w/w AM/AETAC | 70/30 w/w Acrylamide/ acrylic acid, sodium salt |
| Polymer, % | 25.585 | 38.093 | 25.029 |
| Water, % | 47.550 | 33.614 | 48.385 |
| Oil, % | 23.785 | 25.199 | 24.327 |
| Surfactant, % | 2.023 | 2.029 | 1.750 |
| Inerts, % | 1.057 | 1.064 | 0.509 |
| Total, % (by weight) | 100.000 | 100.000 | 100.000 |

The above described starting polymer compositions were diluted with oil, yielding the evaporator feed compositions described below:

|  | Diluted Polymer 1 | Diluted Polymer 2 | Diluted Polymer 3 |
|---|---|---|---|
| Polymer, % | 9.994 | 9.998 | 9.985 |
| Water, % | 18.574 | 8.823 | 19.302 |
| Oil, % | 70.228 | 75.853 | 66.088 |
| Surfactant, % | 0.790 | 5.047 | 4.421 |
| Inerts, % | 0.413 | 0.279 | 0.203 |
| Total, % (by weight) | 100.000 | 100.000 | 100.000 |

The above described diluted polymer compositions were fed to a falling film evaporator, yielding the decanter centrifuge feed compositions described below:

|  | Centrifuge Polymer 1 | Centrifuge Polymer 2 | Centrifuge Polymer 3 |
|---|---|---|---|
| Polymer, % | 12.312 | 11.010 | 12.369 |
| Water, % | 0.200 | 0.200 | 0.200 |
| Oil, % | 81.514 | 82.925 | 81.702 |
| Surfactant, % | 5.465 | 5.558 | 5.477 |
| Inerts, % | 0.509 | 0.308 | 0.252 |
| Total, % (by weight) | 100.000 | 100.000 | 100.000 |

The above described centrifuge feed compositions were fed to a decanter centrifuge, yielding the following flocculating centrifuge concentrate and centrifuge raffinate products.

|  | Centrifuge Conc. 1 | Centrifuge Conc. 2 | Centrifuge Conc. 3 |
|---|---|---|---|
| Polymer, % | 74.389 | 69.196 | 74.258 |
| Water, % | 1.251 | 1.502 | 1.220 |
| Oil, % | 17.266 | 17.098 | 17.509 |
| Surfactant, % | 3.183 | 2.310 | 1.536 |
| Total, % (by weight) | 100.000 | 100.000 | 100.000 |

|  | Centrifuge 1 | Centrifuge 2 | Centrifuge 3 |
|---|---|---|---|
| Polymer, % | 1.089 | 2.082 | 0.800 |
| Water, % | 0.000 | 0.000 | 0.000 |
| Oil, % | 95.711 | 94.134 | 93.754 |
| Surfactant, % | 3.200 | 3.784 | 5.446 |
| Inerts, % | 0.000 | 0.000 | 0.000 |
| Total, % (by weight) | 100.000 | 100.000 | 100.000 |

A lauryl methacrylate/methacrylic acid settling/compaction stabilizer was added to the centrifuge concentrate, along with an inverting surfactant, yielding the flocculating polymer compositions shown below:

|  | Floc. Polymer Comp. 1 | Floc. Polymer Comp. 2 | Floc. Polymer Comp. 3 |
|---|---|---|---|
| Polymer, % | 70.574 | 64.817 | 70.450 |
| Water, % | 1.187 | 1.406 | 1.158 |
| Oil, % | 6.010 | 11.539 | 7.495 |
| Surfactant, % | 16.911 | 17.805 | 17.142 |
| Inerts, % | 3.019 | 2.163 | 1.457 |
| Stabilizer, % | 2.299 | 2.270 | 2.299 |
| Total, % (by weight) | 100.000 | 100.000 | 100.000 |

All of these flocculating polymer compositions were stable, pourable compositions containing polymers having weight average molecular weights of in excess of 10 million, as determined by light scattering techniques.

Example 4

In this example: Flocculant A is a conventional 70/30 w/w acrylamide/acrylic acid emulsion polymer, commercially available from Calgon Corporation. The polymer in Flocculant A has a weight average molecular weight of about 36 million, as determined by light scattering, and is 28% active (weight basis).

Flocculant B is a flocculant polymer which is a 70/30 w/w acrylamide/acrylic acid pourable, non-aqueous polymer composition containing 73% polymer solids. The polymer in Flocculant B has a weight average molecular weight in excess of 10 million.

Flocculants A and B were added at the dosages shown in Table 1 (lbs. polymer, active basis, per ton of hydroxide solids) to an aqueous stream at a commercial metals coating plant. The waste stream to be clarified contained finely dispersed metal hydroxides. Results are shown in Table I.

able from Calgon Corporation. The polymer in Flocculant E has a weight average molecular weight of about 9,000,000 and is about 38% active polymer solids.

Flocculant F is a 40/60 acrylamide/AETAC pourable, non-aqueous polymer composition containing about 73% active polymer solids. The polymer in Flocculant F has a weight average molecular weight of about 9,000,000.

Flocculant E and F were added as flocculant aids to the influent of a large screw press used to dewater a waste stream primarily comprising the mixed wastes of a paper

TABLE I

| Polymer | ACTIVE DOSAGE (#/TON) | INFLUENT SOLIDS (%) | THICKENED SOLIDS (%) | FILTRATE CLARITY (NTU) | SYSTEM FLOW (GAL/MIN) | PRODUCTION RATE (DRY TON/DAY) |
|---|---|---|---|---|---|---|
| A | 1.98 | 2.2 | 6.0 | 38 | 518 | 18.4 |
| A | 1.75 | 2.2 | 5.9 | 22 | 518 | 18.4 |
| A | 1.75 | 2.2 | 5.9 | 22 | 519 | 18.4 |
| B | 1.70 | 2.2 | 6.0 | 34 | 518 | 18.4 |
| B | 1.38 | 2.0 | 5.6 | 3.1 | 520 | 16.8 |
| B | 1.08 | 2.1 | 5.7 | 6.1 | 520 | 17.6 |
| B | 1.00 | NM* | NM* | 22 | 520 | 18.5 |
| B | 0.87 | 2.2 | 5.5 | 28 | 520 | 18.5 |
| B | 1.02 | 2.2 | 5.5 | 21 | 518 | 18.4 |
| A | 4.45 | 2.4 | 5.2 | 36 | 400 | 15.6 |
| A | 4.81 | 2.6 | 5.3 | 32 | 400 | 16.8 |
| A | 5.00 | 2.6 | NM* | 32 | 460 | 19.4 |
| B | 2.99 | 2.6 | 5.1 | 16 | 537 | 22.6 |
| B | 3.42 | 2.7 | 5.5 | 7.4 | 540 | 23.5 |
| B | 3.32 | 3.0 | 5.4 | 7.0 | 601 | 29.2 |
| B | 3.70 | 2.7 | 5.1 | 18 | 598 | 26.1 |

*NOT MEASURED

Example 5

In this example: Flocculant C is a conventional 77/23 w/w acrylamide/acryloyloxyethyltrimethyl ammonium chloride (AETAC) emulsion polymer, commercially available from Calgon Corporation. The polymer in Flocculant C has a weight average molecular weight of about 10,000,000, and is 25% active.

Flocculant D is a 77/23 acrylamide/AETAC pourable, non-aqueous polymer composition containing about 73% active polymer solids. The polymer in Flocculant D has a weight average molecular weight of about 10,000,000.

Flocculants C and D were added as retention/flocculant aids to the wet end of a cylinder paper machine. Both flocculant C and D were fed in a similar fashion to a pulp slurry at the dosages shown in Table II (lbs. polymer, active basis, per ton of paper solids). The cylinder filler vat retentions, the amount of solids contained in the tray water, and the consistency of the formed paper sheet as it entered the dryers were measured daily for a 2 month period for each flocculant. Results of the average values for each measured parameter are shown in Table II.

TABLE II

| Polymer | Dosage (#/ton active) | Retentions (% w/w) Cyclinder Filler Vat # | | | | | Tray Water Solids (ppm) | Sheet Cons. into Dryers (% w/w solids) |
|---|---|---|---|---|---|---|---|---|
| | | 2 | 3 | 4 | 5 | Ave | | |
| C | 0.28 | 89 | 82 | 90 | 74 | 84 | 106 | 47 |
| D | 0.24 | 94 | 88 | 88 | 90 | 90 | 45 | 52 |

Example 6

In this example: Flocculant E is a conventional 40/60 w/w acrylamide/AETAC emulsion polymer, commercially availmill. The dosage of both E and F was optimized (lbs. polymer, active perton of dry ton of solids) and the solids content of the filtrate of the press, the pressed cake solids and the capture of solids measured periodically. A summary of the average results obtained over a 2 day period for each flocculant are shown in Table III.

TABLE III

| | Dosage | Solids Content ($ w/w) | | | Press Capture |
|---|---|---|---|---|---|
| Polymer | (#/ton active) | Feed | Filtrate | Pressed Cake | (% w/w) |
| E | 0.90 | 6.55 | 0.0268 | 31.0 | 99.7 |
| F | 0.83 | 6.55 | 0.0357 | 31.4 | 99.6 |

What is claimed is:

1. A method for flocculating suspended solids from an aqueous system containing said suspended solids and water comprising added to said aqueous system an effective amount of flocculating agent, wherein said flocculating agent is a non-aqueous, water soluble polymer composition containing less than about 5%, based on the weight of said polymer composition, water, a greater than about 60%, based on the weight of said polymer composition, polymer solids, and an effective amount of stabilizer selected from the group consisting of $C_4$–$C_{20}$ alkyl (meth)acrylate homopolymers and $C_4$–$C_{20}$ alkyl (meth)acrylate/(meth) acrylic copolymers, to reduce compaction or separation of said composition.

2. The method of claim 1, wherein said non-aqueous, water soluble polymer composition contains less than about 3% water and greater than about 70% polymer solids.

3. The method of claim 1, wherein said effective amount is at least 0.1 ppm active polymer, based on the weight of water in the aqueous system being treated.

4. The method of claim 2, wherein said effective amount is at least 0.1 ppm active polymer, based on the weight of water in the aqueous system being treated.

5. In a method for clarifying an aqueous system containing water and suspended solids via addition of an effective amount of a water soluble polymer flocculating agent, the improvement which comprises using as the flocculating agent the non-aqueous, water soluble polymer composition of claim 1.

6. The method of claim 1, wherein said aqueous system contains metal hydroxide solids.

7. The method of claim 1, wherein said method for flocculating suspended solids is a retention method in a papermaking process.

8. The method of claim 1, wherein said method for flocculating suspended solids is a waste dewatering method.

* * * * *

UNITED STATES PATENT AND TRADEMARK OFFICE
CERTIFICATE OF CORRECTION

PATENT NO. : 5,725,780
DATED : March 10, 1998
INVENTOR(S) : Carpenter et al.

It is certified that error appears in the above-identified patent and that said Letters Patent is hereby corrected as shown below:

Column 2, line 23, the word "product" should read "products' ".

Column 5, line 52, "N-i-propyiacrylamide" should read "N-i-propylacrylamide".

Column 7, line 57, the period after the word "than" should be deleted.

Signed and Sealed this

Fifteenth Day of June, 1999

Attest:

Q. TODD DICKINSON

Attesting Officer

Acting Commissioner of Patents and Trademarks